US012589554B2

(12) United States Patent
Šípoš

(10) Patent No.: US 12,589,554 B2
(45) Date of Patent: Mar. 31, 2026

(54) WAVEGUIDE FOR PLASTIC WELDING, ARRANGEMENT, AND WELDING METHOD WITH A WAVEGUIDE, AND MANUFACTURING METHOD OF A WAVEGUIDE

(71) Applicant: BRANSON Ultraschall Niederlassung der Emerson Technologies Gmbh & Co. OHG, Dietzenbach (DE)

(72) Inventor: L'udovít Šípoš, Škultétyho (SK)

(73) Assignee: BRANSON ULTRASCHALL NIEDERLASSUNG DER EMERSON TECHNOLOGIES GMBH & CO. OHG, Dietzenbach (DE)

( * ) Notice: Subject to any disclaimer, the term of this patent is extended or adjusted under 35 U.S.C. 154(b) by 27 days.

(21) Appl. No.: 18/531,221

(22) Filed: Dec. 6, 2023

(65) Prior Publication Data

US 2024/0181719 A1     Jun. 6, 2024

(30) Foreign Application Priority Data

Dec. 6, 2022    (EP) ..................................... 22211602

(51) Int. Cl.
*B29C 65/16*          (2006.01)
*G02B 6/42*           (2006.01)

(52) U.S. Cl.
CPC ........ *B29C 65/1687* (2013.01); *G02B 6/4214* (2013.01)

(58) Field of Classification Search
CPC . B29C 65/1687; B29C 65/16; B29C 65/1641; G02B 6/4214
See application file for complete search history.

(56) References Cited

U.S. PATENT DOCUMENTS

2013/0322822 A1* 12/2013 Roeger .............. B23K 26/0652
                                                          385/36
2019/0263073 A1*  8/2019 Blasko .............. B29C 66/12443

FOREIGN PATENT DOCUMENTS

DE      102004058221 A1    6/2005
DE      112007002109 T5    7/2009
          (Continued)

OTHER PUBLICATIONS

Japanese Patent Office; Notification of Reason(s) for Refusal; Patent Application No. 2023-200751; Mailing Date: Nov. 26, 2024; (5 pages).

(Continued)

*Primary Examiner* — Daniel Mcnally
(74) *Attorney, Agent, or Firm* — Barclay Damon LLP

(57)          ABSTRACT

A curved and one-sidedly open waveguide for plastic welding, especially for laser transmission welding, includes a first reflecting element having a reflecting surface by means of which laser light can be reflected. The reflecting surface defines a receiving end at which laser light from a laser light source, in particular a light guide or a plurality of light guides, is receivable, and an output end at which laser light is directable into a laser light transmitting work piece. The reflecting surface is defined by a curve between the receiving end and the output end so that the reflecting surface of the first reflecting element has a continuously curved concave shape when viewed in cross-section. Further, the first reflecting element is not opposed by a second reflecting element so that the waveguide is open in the direction normal to the reflecting surface.

6 Claims, 2 Drawing Sheets

(56)            References Cited

FOREIGN PATENT DOCUMENTS

| | | | | |
|---|---|---|---|---|
| EP | 3533589 | A1 | | 9/2019 |
| IT | 201800005899 | A1 | | 12/2019 |
| JP | 03238189 | A | * | 10/1991 |
| JP | H03-238189 | A | | 10/1991 |
| JP | 2013202876 | A | | 10/2013 |
| JP | 2018081839 | A | | 5/2018 |
| JP | 2019076906 | A | | 5/2019 |
| JP | 2019-171851 | A | | 10/2019 |

OTHER PUBLICATIONS

Japanese Patent Office; Notification of Reason(s) for Refusal; Patent Application No. 2023-200751; Mailing Date: Nov. 26, 2024; (6 pages) English Translation.
European Patent Office, European Search Report from European Appl. No. EP 22 211602.2, mailed/dated May 19, 2023 (total 7 pages).

\* cited by examiner

WAVEGUIDE FOR PLASTIC WELDING, ARRANGEMENT, AND WELDING METHOD WITH A WAVEGUIDE, AND MANUFACTURING METHOD OF A WAVEGUIDE

CROSS-REFERENCE TO RELATED APPLICATION

This application is based upon and claims priority to, under relevant sections of 35 U.S.C. § 119, European Patent Application No. 22 211 602.2, filed Dec. 6, 2022, the entire contents of which are hereby incorporated by reference.

FIELD OF THE INVENTION

The present invention is related to a curved and one-sidedly open waveguide for plastic welding, especially for laser transmission welding, an arrangement for plastic welding comprising the waveguide, a method for plastic welding using the arrangement with the waveguide and a manufacturing method of the waveguide.

BACKGROUND OF THE INVENTION

Generally, several types of waveguides for directing or transmitting laser light for plastic welding are known. Often, the last element of an arrangement for plastic welding includes a waveguide, before the laser light of a laser light source enters the components to be welded. The waveguide is especially designed to homogenize the distribution of the laser light so that the energy of the laser light enters the components to be welded as uniformly as possible, such that individual focal points are avoided.

To this end, there are mainly two types of waveguide, namely positive and negative waveguides. Positive waveguides consist of a solid state which guides laser light in the interior following the law of total internal reflection. An example of such a positive waveguide is described in DE 10 2004 058 221 A1. Negative waveguides have the feature of a channel-like cavity, which is coated with a reflective layer and in which the laser light is guided between two oppositely arranged reflecting elements. An example of such a negative waveguide is described in DE 11 2007 002 109 T5. The negative waveguide described there has a non-conical longitudinal cross-section producing a non-circular weld zone. Further, negative waveguides having a conical longitudinal cross-section are also known.

With respect to the waveguide as usually the last element of a welding arrangement prior to the components to be welded to each other, it is thus desirable that energy losses due to the waveguide are kept as small as possible.

In this regard, EP 3 533 589 A1 also describes a waveguide for plastic welding, an arrangement for plastic welding, a welding method, as well as a manufacturing method of the waveguide. Here, a waveguide for plastic welding comprises an entry end defining an entry face for laser light, an exit end defining an exit face for laser light as well as a first and a second inner face which are arranged between the entry end and the exit end, which are arranged opposite to each other and by means of which laser light can be reflected. A first distance between the entry end and the exit end defines a length of the waveguide and a second distance between the first and the second inner face defines a thickness of the waveguide. In a first embodiment, the exit end is arranged opposite to the entry end and a central plane of the waveguide extends centrally from the entry end to the exit end. The first inner face comprises a continuously curved, concave shape so that a third distance between the first inner face and the central plane of the waveguide varies continuously from the entry end in the direction of the exit end. In an alternative embodiment, the first inner face comprises a continuously curved concave shape which is part of a first spiral, especially a first natural spiral, so that a radius of the first spiral from a point of origin of the first spiral to the first inner face varies continuously along the waveguide.

It is therefore a problem of the present invention to provide a waveguide which is optimized with respect to the manufacturing process as well as the costs. At the same time, the efficiency of the waveguide compared to the known waveguides shall be maintained.

SUMMARY OF THE INVENTION

The above object is solved by a curved and one-sidedly open waveguide for plastic welding, an arrangement for plastic welding, a method for plastic welding, as well as a manufacturing method of a waveguide according to the claims. Further preferred embodiments and developments result from the following description, the drawings, as well as the appending claims.

A inventive curved and one-sidedly open waveguide for plastic welding, especially for laser transmission welding, comprises a first reflecting element having a reflecting surface by means of which laser light can be reflected, wherein the reflecting surface defines a receiving end at which laser light from a laser light source, in particular a light guide or a plurality of light guides, is receivable, and an output end at which laser light is directable into a laser light transmitting work piece, and the reflecting surface is defined by a curve between the receiving end and the output end so that the reflecting surface of the first reflecting element has a continuously curved concave shape when viewed in cross-section, and the first reflecting element is not opposed by a second reflecting element so that the waveguide is open in the direction normal to the reflecting surface.

The inventive waveguide is described in the following as part of its usage in an arrangement for plastic welding, especially in an arrangement for laser transmission welding. Laser transmission welding is a one-step process in which the heating of the components to be welded and the joining process take place almost at the same time. For this process, one of the components to be welded must have a high transmittance or transmission degree in the range of the laser wavelength and the other component must have a high absorptance or absorptivity. Prior to the welding process, both components are positioned in the desired end position and the joining pressure is applied. The laser beam radiates or shines through the transparent or transmission component without considerable heating. At first in the absorption component the laser beam is absorbed in a surface near layer, wherein the laser energy is converted into thermal energy and the absorption component is melted at these places. Due to thermal conduction processes, the transmission component is also plasticized in the joining zone. By means of the joining force applied from the outside as well as the inner joining pressure resulting from the expansion of the plastic melt, an adhesive bond connection of the two components is achieved. Here, it is especially preferred to use the inventive waveguide as part of a simultaneous laser transmission welding which is subsequently also denoted as simultaneous welding.

During the simultaneous welding, preferably the whole welding contour or seam contour of the components to be welded to each other is irradiated at the same time. This ensures an extreme reduction of the process times and makes a bridging of the clearances possible by means of melting away. Additionally, the welding seam is stronger, as compared to contour welding, in which a laser beam is guided along the seam as the simultaneous welding has a higher interaction time.

During the operation of a respective arrangement for plastic welding, especially for laser transmission welding, laser light runs from a laser light source through an often flexible light guide or a bundle of flexible light guides which is coupled at its end facing away from the laser light source to the waveguide, in particular to the receiving end of the waveguide. The laser light then exits the light guide or the bundle of light guides and enters the waveguide, i.e., the laser light is reflected at the reflecting surface of the first reflecting element, homogenized thereby and impinges on the components to be welded thereafter. Thus, the waveguide forms the last part along the path of the laser light before the laser light enters the transmission component.

Regarding the designs of waveguides, and as has been outlined at the beginning, a positive waveguide is defined by a solid body in which complete internal reflection occurs whereas a negative waveguide is defined by a cavity through which the laser light is guided. Thus, the negative waveguide has a channel like design or construction.

In the present case, and as the waveguide is open on one side, i.e., in the direction normal to the reflecting surface of the first reflecting element and is, thus, not opposed by a second reflecting element, no channel-like design or construction is present. In this regard, and for safety reasons, the arrangement must be enclosed by a housing so that in use laser light can at least not leave the housing or enclosure. By proceeding this way, a worker using the arrangement is prevented from harm due to the laser light in use of the arrangement. As a result, the inventive waveguide does not represent a positive waveguide as the laser light is not passed through a solid body, but it does also not represent a negative waveguide in the narrower sense due to the missing second reflecting element or surface opposite to the first reflecting surface.

With reference to the inventive waveguide, the output end is preferably adapted to a desired seam contour of the components to be welded. For example, and in the case of two longitudinal components to be welded to each other, the waveguide has a longitudinal shape transverse to the direction of the laser light passing through the waveguide. An extension of the waveguide in this direction is also defined as width. Consequently, an extension of the waveguide in the direction of the laser light passing through the waveguide, i.e., from the receiving end to the output end, is defined as length. Such a length is preferably measured along the reflecting surface. According to a further example and in case two annular shaped components must be welded to each other, the output end is also annular.

According to the invention, the reflecting surface has a continuously curved, concave shape. In the cross-section of the first reflecting element, the reflecting surface is thus curved to the inside. Due to this design or shaping of the reflecting surface, an angle is enclosed between the receiving end and the output end of the waveguide. Thus, the receiving end of the waveguide is in particular not arranged opposite to the output end. It is decisive that the reflecting surface has the continuously curved concave shape.

In preferred embodiments, the inventive waveguide is a section of a waveguide portion or an integral part of a waveguide. For example, prior to the receiving end and/or after the output end, a common straight-lined (linear) negative waveguide is present. The receiving end in this latter case, begin where the reflecting surface starts having a concave shape. Accordingly, the output end is present where the reflecting surface having a concave shape ends.

With respect to the above explanations, and in other words, the inventive waveguide represents with respect to a negative waveguide having a channel like cavity a partial waveguide having no opposing reflecting face normal to the reflecting surface of the first reflecting element. An advantage of this design is the reduced number of components which, in turn, results in an increased cost efficiency due to money savings concerning the material used, the manufacturing process required, including the application of the reflecting layer, or goldening, as well as the assembly of the waveguide. Furthermore, the cleaning of the waveguide is made easier. Nevertheless, and as a disadvantage, an arrangement which uses the inventive waveguide must be arranged in a respective housing for safety reasons so that no worker is harmed by the laser light during welding.

A specific advantage of this construction is that the laser light can be bundled at least with the same power at the output end by means of the inventive waveguide, as compared to known waveguides. Further, and by means of the inventive waveguide, a homogeneous power density distribution can be achieved at the welding seam. In this way, a larger tolerance between the waveguide and the components to be welded can be compensated, which increases the simplicity of the usage of an arrangement using the inventive waveguide.

According to a preferred embodiment of the waveguide, the curve is selected from one of the following: a circle, a parabola, an exponential function, or a spiral. Accordingly, the curved concave shape may be part of a circle, a parabola, an exponential function, or a spiral. Thus, the waveguide can be adapted to the desired application in a very efficient manner.

Further, and due to the usage of a part or section of one of the above curves, the interaction between laser beams and the reflecting surface of the waveguide is reduced, especially compared to a straight-lined (linear) waveguide.

Now referring to the preferred embodiment according to which the curve is part of a spiral, the following must be noted additionally. A spiral as a two-dimensional figure is defined in that the radius of the spiral from its point of origin varies continuously. This distinguishes the spiral for example from a circle in which the radius is always constant. The radius of the spiral varies or changes due to the design of the reflecting surface from its point of origin to the reflecting surface along the waveguide continuously, which will be discussed later within the detailed description.

In a preferred embodiment of the waveguide, a radius of the spiral increases or decreases continuously from the point of origin of the first spiral to the reflecting surface along the waveguide from the receiving end to the output end. In this way, curvatures of the reflecting surface of the waveguide, which are adapted to the respective case of application, are obtainable.

Especially preferred, the concave continuously curved shape, which is part of a spiral, is chosen from one of the following spiral types: hyperbolic, Archimedean, logarithmic or from a spiral based on the Fibonacci-sequence. The Fibonacci-sequence is the sequence $(F_n)_{n \in N}$ with F1=F2=1 and Fn+2=Fn+Fn+1. The spiral based on the Fibonacci-sequence is a subset of the logarithmic spiral. By means of this configuration, laser light can be guided by the waveguide with exceptionally low losses, especially to an undercut of the components to be welded.

A curve which intersects all beams starting from the point of origin O in the same angle α is defined as a logarithmic spiral. In case of the logarithmic spiral and if a sub-section of the spiral is present, the point of origin can be determined when the angle α is known. As a spiral is a two-dimensional figure, the waveguide must be viewed here in cross-section. A direction vector of the straight line extends in this case from the reflecting surface in the direction normal or perpendicular to the reflecting surface.

In a further preferred embodiment of the waveguide, an angle in the range of 30° to 150° is enclosed between the receiving end and the output end. Based on the desired angle for the respective case of application, for example due to undercuts being present at the components to be welded, as well as on the available installation space, the desired curve can be chosen to realize the concave shape of the reflecting surface.

In a further preferred embodiment of the waveguide, the curve has a radius of curvature between 6.0 mm and 14.0 mm, preferably between 6.0 mm and 10.0 mm, and particularly preferred of 8.0 mm. In particular and by means of these ranges of the radius of curvature, the efficiency of the waveguide can be adapted to the desired application, i.e., the components to be welded to each other.

An inventive arrangement for plastic welding, especially for laser transmission welding, comprises a laser light source, a light guide, preferably a plurality of light guides, and an inventive waveguide, wherein in the operation of the arrangement the laser light passes from the laser light source through the light guide and is subsequently reflected at least once at the reflecting surface of the reflecting element of the waveguide. As the inventive arrangement uses the inventive waveguide, reference is made to the above explanations regarding the technical effects and advantages for avoiding repetitions.

In a preferred embodiment of the arrangement, an angle between the light guide and the receiving end of the reflecting surface ranges from 7° to 14°, preferably from 8° to 12° and is particularly preferred to be about 10°. It has been found that this particular angle range realizes an effective reflection of the laser light exiting the light guide at the reflecting surface of the waveguide. Consequently, the welding of the two components to each other can be further improved.

An inventive method for plastic welding, especially for laser transmission welding, with an inventive arrangement, comprises the following steps: arranging two plastic components to be welded to each other in a mounting device, creating laser light by means of a laser light source, wherein the laser light passes through the light guide, preferably a plurality of light guides, and is subsequently reflected at least once at the reflecting surface of the first reflecting element of the inventive waveguide, and welding the plastic components to be welded to each other by means of the laser light reflected by the inventive waveguide. By means of the inventive method, two plastic components are welded to each other. As the method for plastic welding uses the inventive arrangement and, thus, the inventive waveguide, it is again referred to the above explanations regarding the technical effects and advantages. Accordingly, respective redundancies are avoided.

An inventive manufacturing method of an inventive waveguide, comprises the steps: providing a first element having a surface defined by a curve between a receiving end at which laser light from a laser light source, in particular a light guide or a plurality of light guides, shall be received in use and an output end at which laser light shall be directed into a laser light transmitting work piece in use so that the surface of the first element has a continuously curved concave shape when viewed in cross-section, and applying a reflecting layer on the surface with the continuously curved concave shape so that a reflecting surface and, thus, a first reflecting element is formed. This method serves for manufacturing the inventive waveguide. Concerning technical effects of the inventive waveguide as well as respective advantages, it is referred to the above explanations for avoiding repetitions.

BRIEF DESCRIPTION OF THE DRAWINGS

In the following, the present invention will be described in detail based on the drawings. In the drawings, the same reference signs denote the same elements and/or components, in which.

DETAILED DESCRIPTION OF PREFERRED EMBODIMENTS

Figure 1:
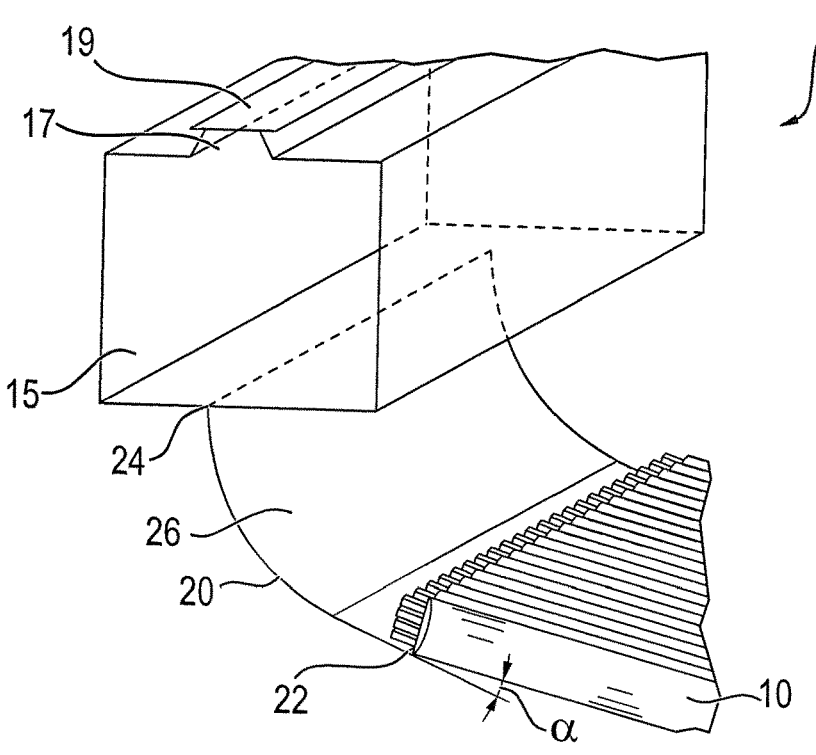
FIG. 1 is a first perspective view of an embodiment of an arrangement for plastic welding with an embodiment of the waveguide according to the present invention.
Figure 2:
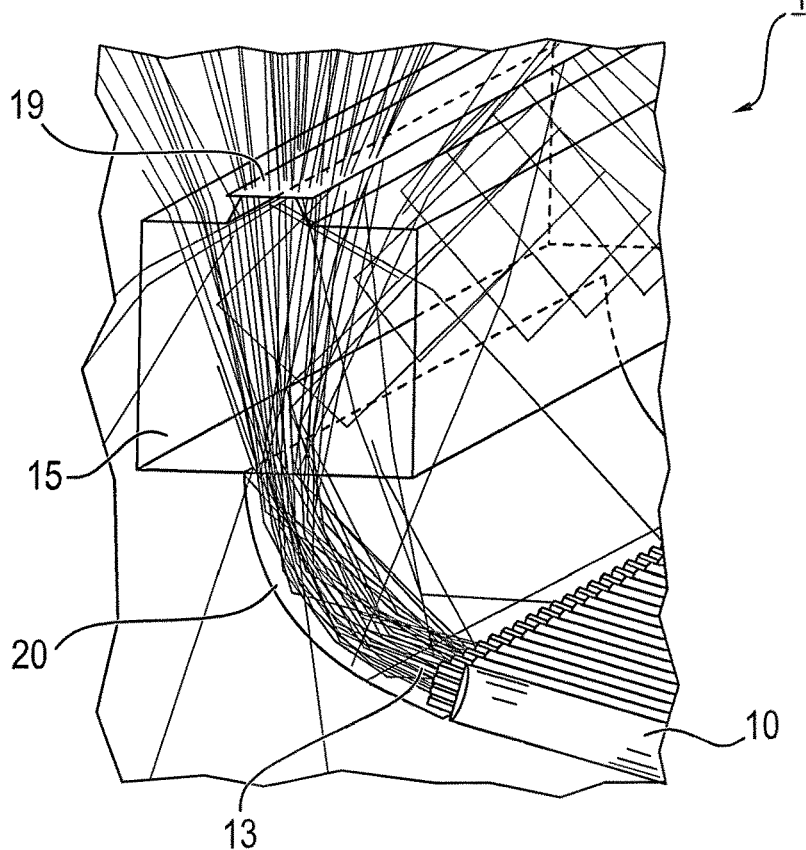
FIG. 2 shows a second perspective view of an embodiment of an arrangement for plastic welding with an embodiment of the waveguide according to the present invention including the respective courses of laser beams.

In the following, and with respect to FIGS. 1 and 2, an embodiment of an inventive arrangement 1 for plastic welding comprising an embodiment of an inventive waveguide 20 is discussed. The arrangement 1 for plastic welding may be used, for example, for welding lights in the automotive industry. Consequently, a transmission component 15 shall be welded to an absorption component 19. In the figures, the absorption component 19 is shown only at the connecting plane for an easier understanding. Further, and for improving the welding, the transmission component 15 comprises welding ribs 17.

The arrangement 1 comprises a laser light source (not shown), a light guide 10, preferably a plurality of light guides 10, and an embodiment of the inventive waveguide 20. In the operation of the arrangement 1, the laser light passes from the laser light source through the light guide 10 and is subsequently reflected at least once at a reflecting surface 26 of a first reflecting element of the waveguide 20, as can be seen in FIG. 2. Thus, the waveguide 20 forms the last part along the path of the laser light before the laser light enters the transmission component 15.

An angle α between the light guide 10 and a receiving end 22 of the reflecting surface of the waveguide 20 ranges from 7° to 14°, preferably from 8° to 12°, and is particularly preferred to be about 10°. It has been found that this particular angle range realizes an effective reflection of the laser light exiting the light guide 10 at the reflecting surface 26 of the waveguide 20.

The output end 24 of the waveguide 20 is adapted to a desired seam contour of the components to be welded.

Regarding the designs of waveguides, and as has been outlined at the beginning, a positive waveguide is defined by a solid body in which complete internal reflection occurs, whereas a negative waveguide is defined by a cavity through which the laser light is guided. Thus, a negative waveguide has a channel-like design or construction.

In the present case, and as the waveguide is open on one side, i.e., in the direction normal to the reflecting surface 26 of the first reflecting element and is, thus, not opposed by a second reflecting element, no channel like design or construction is present. In this regard, and for safety reasons, the arrangement 1 must be enclosed by a housing (not shown) so that in use laser light can at least not leave the housing or enclosure. By proceeding this way, a worker using the arrangement 1 is prevented from harm due to the laser light being present during use of the arrangement 1. As a result, the waveguide 20 does not represent a positive waveguide as the laser light is not passed through a solid body, nor does the waveguide represent a negative waveguide in the narrower sense due to a missing second reflecting element or surface opposite to the reflecting surface 26.

As can be seen, the reflecting surface 26 has a continuously curved, concave shape. In the cross-section of the first reflecting element, the reflecting surface 26 is thus curved to the inside. Due to this design or shaping of the reflecting surface 26, an angle is enclosed between the receiving end 22 and the output end 24 of the waveguide 20. Thus, the receiving end 22 of the waveguide 20 is in particular not arranged opposite to the output end 24. It is decisive that the reflecting surface 26 has the continuously curved concave shape. An angle in the range of 30° to 150° is, thus, preferably enclosed between the receiving end 22 and the output end 24. Based on the desired angle for the respective case of application, for example due to undercuts being present at the components 15, 19 to be welded, as well as the available installation space, the desired curve can be chosen to realize the concave shape of the reflecting surface 26.

The curve is selected from one of the following: a circle, a parabola, an exponential function, or a spiral. Accordingly, the curved concave shape may be part of a circle, a parabola, an exponential function, or a spiral. Thus, the waveguide can be adapted to the desired application in a very efficient manner. In the present example, the curve is part of a circle and, thus, has a constant radius of curvature.

Further, and with respect to the curve, it is particularly preferred that the curve has a radius of curvature between 6.0 mm and 14.0 mm, preferably between 6.0 mm and 10.0 mm, and particularly preferred to be 8.0 mm. By means of these ranges of the radius of curvature, the efficiency of the waveguide 20 can be adapted to the desired application, i.e., the components to be welded to each other.

Due to the usage of a part or section of one of the above curves, the interaction between laser beams and the reflecting surface 26 of the waveguide 20 is reduced, especially compared to a straight-lined (linear) waveguide. In this regard, reference is made to FIG. 2.

For the sake of completeness, and in case the curve is part of a spiral, the following must be additionally noted. A spiral as a two-dimensional figure is defined such that the radius of the spiral from its point of origin continuously varies. This distinguishes the spiral, for example, from a circle in which the radius is always constant. The radius of the spiral varies or changes due to the design of the reflecting surface continuously from its point of origin to the reflecting surface along the waveguide. Thus, a radius of the spiral increases or decreases continuously from the point of origin of the first spiral to the reflecting surface along the waveguide from the receiving end 22 to the output end 24. In this way, curvatures of the reflecting surface 26 of the waveguide 20 which are adapted to the respective case of application, are obtainable.

Moreover, the concave continuously curved shape, which is part of a spiral, is chosen from one of the following spiral types: hyperbolic, Archimedean, logarithmic or from a spiral based on the Fibonacci-sequence. The Fibonacci-sequence is the sequence $(F_n)_{n \in N}$ with $F_1 = F_2 = 1$ and $F_{n+2} = F_n + F_{n+1}$. The spiral based on the Fibonacci-sequence is a subset of the logarithmic spiral. By means of this configuration, laser light can be guided by the waveguide 20 with exceptionally low losses, especially to an undercut of the components 15, 19 to be welded.

A curve which intersects all beams starting from the point of origin O in the same angle β is defined as a logarithmic spiral. In case of a logarithmic spiral and if a sub-section of the spiral is present, the point of origin can be determined when the angle β is known. As a spiral is a two-dimensional figure, the waveguide 20 must be viewed here in cross-section. A direction vector of the straight line extends in this case from the reflecting surface 26 in the direction normal or perpendicular to the reflecting surface 26.

For the sake of completeness, it is pointed out that waveguide 20 may be a section of a waveguide portion or an integral part of a waveguide. For example, prior to the receiving end 22 and/or after the output end 24, a common straight-lined (linear) negative waveguide may be present. The receiving end 22 begins, in this case, where the reflecting surface 26 starts having a concave shape. Accordingly, the output end 24 is present where the reflecting surface 26 ends having a concave shape.

In other words and with respect to the above, the waveguide 20 represents with respect to a negative waveguide having a channel-like cavity, a partial waveguide having no opposing reflecting surface normal to the reflecting surface 26 of the first reflecting element. An advantage of this design is the reduced number of components which, in turn, results in an increased cost efficiency due to money savings concerning the material used, the manufacturing process required, including the application of the reflecting layer, or goldening, as well as the assembly of the waveguide. Furthermore, the cleaning of the waveguide 20 is made easier. Nevertheless, and as a disadvantage, an arrangement 1 which uses such a waveguide 20 must be arranged in a respective housing for safety reasons such that no worker is harmed by the laser light during welding.

A further specific advantage of this construction is that the laser light can be bundled at least with the same power at the output end 24 by means of the waveguide 20, as compared to known waveguides. Further, and by means of the waveguide 20, a homogenous power density distribution can be achieved at the welding seam. In this way, a larger tolerance between waveguide 20 and the components 15, 19 to be welded can be compensated which increases the simplicity of the usage of an arrangement 1 using the waveguide 20.

Figure 3:
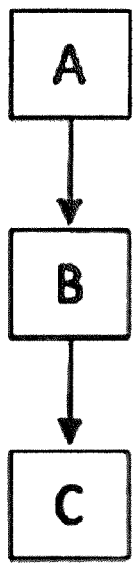
FIG. 3 illustrates a flowchart of an embodiment of a welding method according to the present invention.

Now referring to FIG. 3, an embodiment of an inventive method for plastic welding, especially for laser transmission welding, with the inventive arrangement is discussed. In a first step A, two plastic components to be welded to each other are arranged in a mounting device. Next, a creating of laser light by means of a laser light source follows in step B, wherein the laser light passes through the light guide, preferably a plurality of light guides, and is subsequently reflected at least once at the reflecting surface of the first reflecting element of the inventive waveguide. Finally, in step C a welding of the plastic components to be welded to each other by means of the laser light reflected by the inventive waveguide takes place. Thus, and by means of the inventive method, two plastic components are welded to each other. As the method for plastic welding uses the inventive arrangement and, thus, the inventive waveguide, it is referred to the above explanations regarding the technical effects and advantages.

Based on the above, the waveguide 20 is used in an arrangement 1 for laser transmission welding. Laser transmission welding is a one-step process in which the heating of the components to be welded and the joining process take place at the same time. For this process, one of the components 15, 19 to be welded must have a high transmittance or transmission degree in the range of the laser wavelength and the other component must have a high absorptance or absorptivity. Prior to the welding process, both components 15, 19 are positioned in the desired end position and the joining pressure is applied. The laser beam radiates or shines through the transmission component 15 without considerable heating. At first in the absorption component 19, the laser beam is absorbed in a surface near layer, wherein the laser energy is converted into thermal energy and the absorption component 19 is melted at these places. Due to thermal conduction processes, the transmission component 15 is also plasticized in the joining zone. By means of the joining force applied from the outside as well as the inner joining pressure resulting from the expansion of the plastic melt, an adhesive bond connection of the two components 15, 19 is achieved. Here, it is especially preferred to use the waveguide 20 as part of a simultaneous laser transmission welding, which is subsequently also denoted as "simultaneous welding".

During the simultaneous welding, preferably the whole welding contour or seam contour of the components to be welded to each other is irradiated at the same time. This ensures an extreme reduction of the process times and makes a bridging of the clearances possible by means of melting away. Additionally, the welding seam is stronger compared to the contour welding in which a laser beam is guided along the seam as the simultaneous welding has a higher interaction time.

Figure 4:
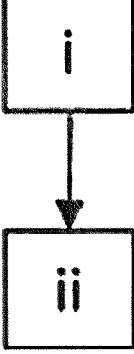
FIG. 4 shows a flowchart of an embodiment of a manufacturing method of a waveguide according to the present invention.

Finally, and with respect to FIG. 4, an inventive manufacturing method of an inventive waveguide is explained. A first element is provided having a surface defined by a curve between a receiving end at which laser light from a laser light source, in particular a light guide or a plurality of light guides, shall be received in use and an output end at which laser light shall be directed into a laser light transmitting work piece in use so that the surface of the first element has a continuously curved concave shape when viewed in cross-section takes place in step i. Thereafter, in step ii a reflecting layer is applied on the surface with the continuously curved concave shape so that a reflecting surface and, thus, a first reflecting element is formed. As a result, the inventive waveguide is manufactured.

LIST OF REFERENCE SIGNS 1 arrangement for plastic welding
10 light guide
13 course of light 15 transmission component
17 welding rib
19 absorption component
20 waveguide
22 receiving end
24 output end
26 reflecting surface
α angle between light guide 10 and receiving end 22 of the waveguide 20

The invention claimed is:

1. A curved and one-sidedly open waveguide for simultaneous laser transmission welding in which the waveguide forms the last part along a path of laser light before the laser light enters a transmission component, the waveguide comprising:
a first reflecting element having a reflecting surface capable of reflecting laser light, wherein
the reflecting surface defines a receiving end of the waveguide at which laser light from a light guide or plurality of light guides as a laser light source is receivable, and an output end of the waveguide at which laser light is directable into a laser light transmitting work piece,
the reflecting surface being defined by a curve between the receiving end and the output end wherein the reflecting surface of the first reflecting element has a continuously curved concave shape when viewed in cross-section, and
wherein the first reflecting element is not opposed by a second reflecting element such that the waveguide is open in a direction normal to the reflecting surface, wherein
the waveguide homogenizes the laser light from the laser light source, and
the output end of the waveguide is adapted to a desired seam contour of the components to be welded such that the entire seam contour is irradiatable at the same time.

2. The waveguide according to claim 1, wherein the curve is defined by one of a circle, a parabola, and exponential function, or a spiral.

3. The waveguide according to claim 1, wherein an angle in the range of 30° to 150° is enclosed between the receiving end and the output end.

4. The waveguide according to claim 1, wherein the curve has a radius of curvature between 6.0 mm and 14.0 mm.

5. An arrangement for simultaneous laser transmission welding, comprising:
a laser light source,
a light guide, and
a waveguide according to claim 1, wherein in the operation of the arrangement, the laser light passes from the laser light source through the light guide and is subsequently reflected at least once at the reflecting surface of the first reflecting element of the waveguide.

6. The arrangement according to claim 5, wherein an angle between the light guide and the receiving end of the reflecting surface ranges from 7° to 14°.

* * * * *